No. 723,275. PATENTED MAR. 24, 1903.
J. HOOD.
DENTAL FLASK.
APPLICATION FILED JULY 12, 1902.
NO MODEL. 2 SHEETS—SHEET 1.
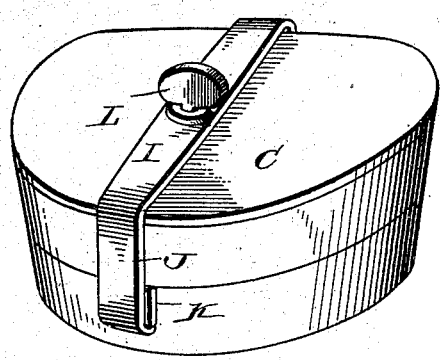
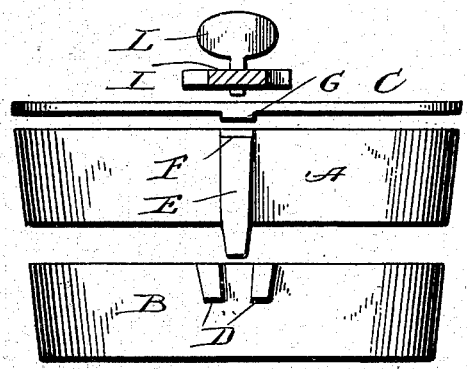
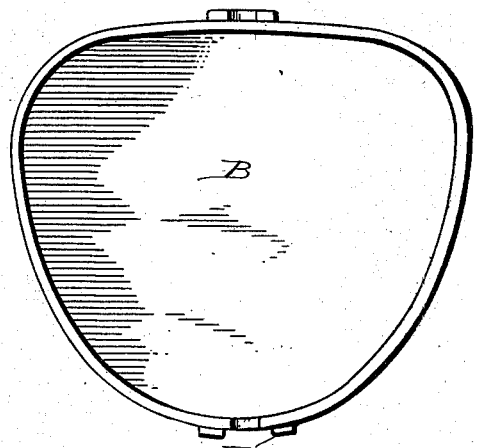
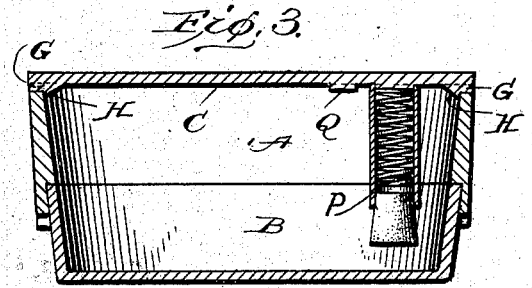
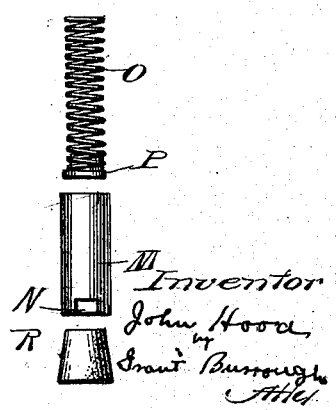
Witnesses:
J. M. Fowler
L. E. Wilson
Inventor
John Hood,
by Grant Burrough
Atty.

No. 723,275. PATENTED MAR. 24, 1903.
J. HOOD.
DENTAL FLASK.
APPLICATION FILED JULY 12, 1902.
NO MODEL. 2 SHEETS—SHEET 2.
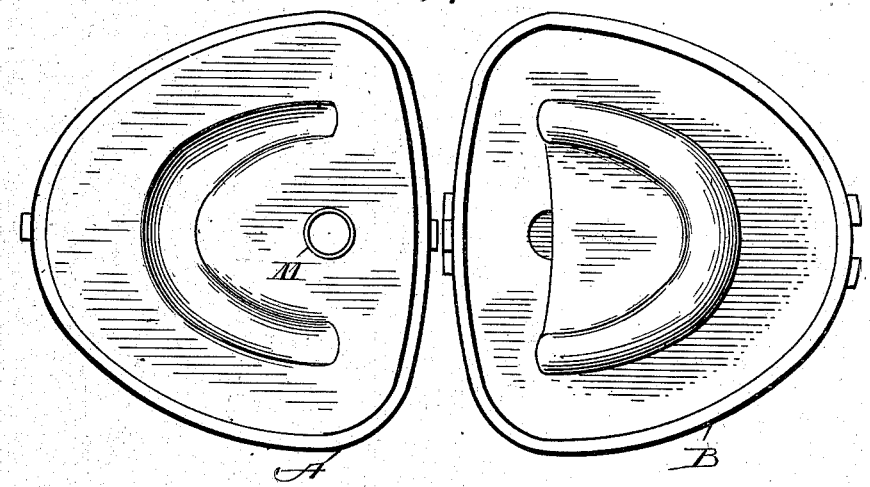
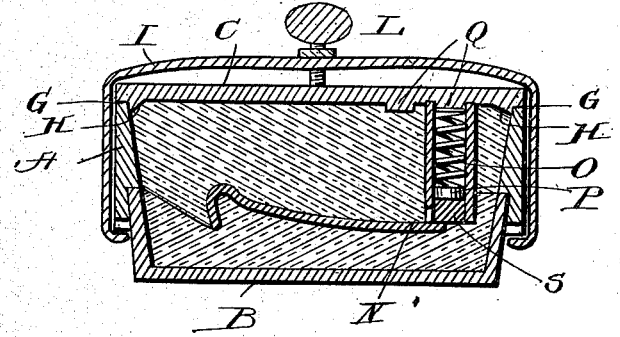

UNITED STATES PATENT OFFICE.

JOHN HOOD, OF HYDEPARK, MASSACHUSETTS, ASSIGNOR OF ONE-HALF TO GEORGE B. HARRIMAN, OF BOSTON, MASSACHUSETTS.

DENTAL FLASK.

SPECIFICATION forming part of Letters Patent No. 723,275, dated March 24, 1903.

Application filed July 12, 1902. Serial No. 115,341. (No model.)

*To all whom it may concern:*

Be it known that I, JOHN HOOD, a citizen of the United States, and a resident of Hydepark, in the county of Norfolk and State of Massachusetts, have invented certain new and useful Improvements in Dental Flasks, of which the following is a full, clear, and exact description, such as will enable those skilled in the art to which it appertains to make and use the same, reference being had to the accompanying drawings, forming a part of this specification.

This invention relates to improvements in dental flasks; and it has for its object the production of such a device as will be of simple construction and of easy manipulation.

It consists in the novel construction, combination, and arrangement of parts such as will be hereinafter fully described, pointed out in the appended claims, and illustrated in the accompanying drawings.

In the drawings, in which similar reference characters designate corresponding parts, Figure 1 is a perspective view of a dental flask embodying the invention. Fig. 2 is an elevation showing its component parts separated. Fig. 3 is a sectional view. Fig. 4 is a plan view of the bottom section. Fig. 5 is a detail view showing the tube for holding the surplus rubber, the compressing-spring, and the temporary stopper. Fig. 6 shows a plan view of the two main sections separated and filled with the mold. Fig. 7 is a sectional view showing the flask filled preparatory to vulcanizing.

The casing of the flask comprises the body-section A, the bottom section B, and the top section or cover C. The bottom section has projecting from its opposite sides the lugs D, arranged in pairs on each side. The spaces between the lugs of each pair form guides, with which register the guide-pins E, projecting downwardly from the body-section A.

In the upper edge of the body-section A, on opposite sides and in line with the guide-pins E, are the recesses F. Projecting from the under side of the top section C are the blocks G, adapted to register with the recesses F in the body-section. The blocks have extensions H, which project into the body-section below the recesses F to engage with the wall of said section.

By means of the several recesses, pins, and blocks an accurate registration of the component parts of the flask can be secured, and they will be held when clamped together against lateral displacement.

Means for clamping the component parts of the flask together are provided. The bail, consisting of the cross-piece I and the arms J, the latter being provided at their extremities with the inwardly-turned hooks K, is placed over the flask, with the hooks engaging with the lugs D of the bottom section. Passing through the cross-piece I is the set-screw L, by the turning of which to impinge upon the top section the several parts can be clamped together.

Sometimes there is not enough of rubber in the mold to complete the denture during the vulcanizing process. A mechanism is provided for holding an extra supply and for forcing it into the mold to supply the deficiency. This mechanism consists of the tube M, provided with the aperture N at one end, and the coiled spring O, having a cap P. The spring is of such size as to fit the tube M, and the end other than the one carrying the cap is of such size as to fit either of the lugs Q, projecting from the under side of the top section C. A stopper R is provided for temporarily closing the tube.

Figs. 6 and 7 show the flask packed preparatory to being subjected to the vulcanizing process.

The method of using the flask is the same as that in ordinary use, except that prior to the introduction of the plaster to fill the flask a small gate is cut at the heel of the cast and on a level with the rubber. The tube M, partially filled with rubber, is placed with its aperture N adjacent to the gate in the heel of the cast. The outer end of the tube is temporarily closed by the stopper R, and then the flask is filled with plaster and treated in the usual way. After the plaster has set it is cut away, so that the temporary stopper R can be removed. After the removal of the stopper the spring O is placed in the tube, with the cap P inwardly and with the outer end of the spring in engagement with one of the lugs Q of the top section. The several parts are clamped together by the bail, and the spiral spring is compressed, so as to have a tendency to force the rubber contained in the tube, as at S, Fig. 7, through the opening N. There is a plurality of lugs Q to accommodate casts of different sizes. After the flask has been clamped it is subjected to the usual process for vulcanizing. During the vulcanizing process should there be a deficiency of rubber in the mold it will be supplied by the spring O pressing the amount required from the tube M through the aperture N and the lower end of the tube. After the completion of the vulcanizing the flask is manipulated in the usual way.

Having thus described my invention, what I claim, and desire to secure by Letters Patent, is—

1. In a dental flask, the casing thereof, a receptacle to be placed in said casing for holding surplus rubber, and means for ejecting the rubber from said receptacle into the casing.

2. A dental flask comprising a bottom section provided with lugs arranged on opposite sides thereof in pairs, a body-section provided with guide-pins to register with the lugs of said bottom section and said body-section also having recesses in its upper edge in line with said guide-pins, a top section having blocks projecting from its under side to register with said recesses in the body-section and said blocks also having extensions to enter said body-section to engage with the walls thereof, a bail having inwardly-turned hooks at its extremities to engage with said lugs of the bottom section, and a set-screw passing through said bail to impinge upon said top section.

3. In a dental flask, the casing thereof, a tube to be placed in said casing, and a spring to be placed in said tube for ejecting the contents therefrom.

4. In a dental flask, a casing having a movable section provided with a lug on its inner face, a tube to be placed in said casing and having an aperture at one end, a spring to be placed in said tube for ejecting the contents therefrom through said aperture and adapted to engage with said lug, and means for securing said movable section in place.

In testimony whereof I hereunto affix my signature in the presence of two witnesses.

JOHN HOOD.

Witnesses:
 ALBERT H. HANSMAN,
 E. BLANCHE JESSEMAN.